Nov. 19, 1963   C. HOLTERMANN   3,111,235
LOADING MACHINE
Filed June 20, 1960   3 Sheets-Sheet 1

INVENTOR
Clemens Holtermann
BY
Michael S. Striker
Attorney

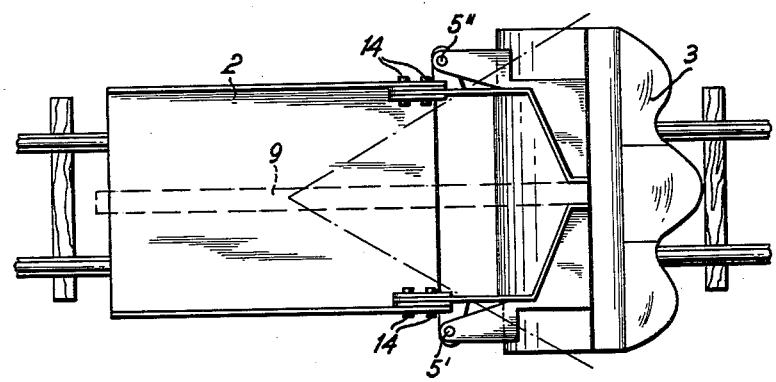
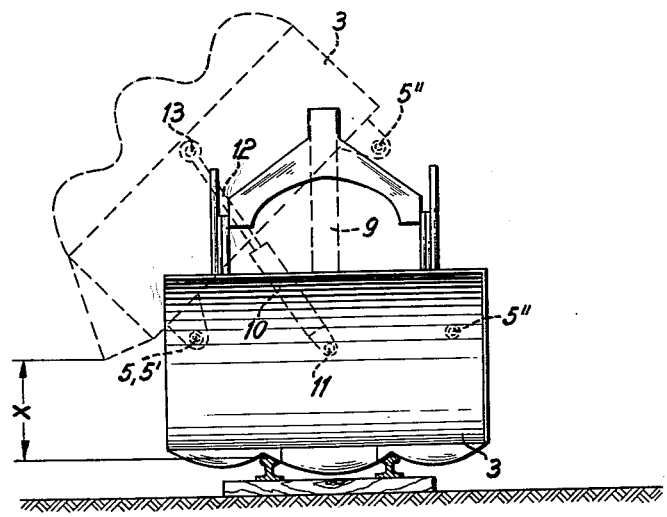

Nov. 19, 1963   C. HOLTERMANN   3,111,235
LOADING MACHINE
Filed June 20, 1960   3 Sheets-Sheet 3
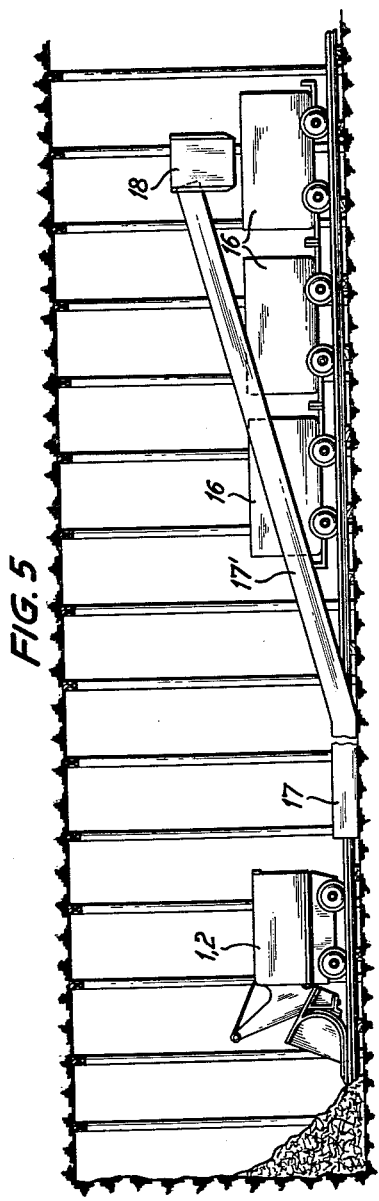
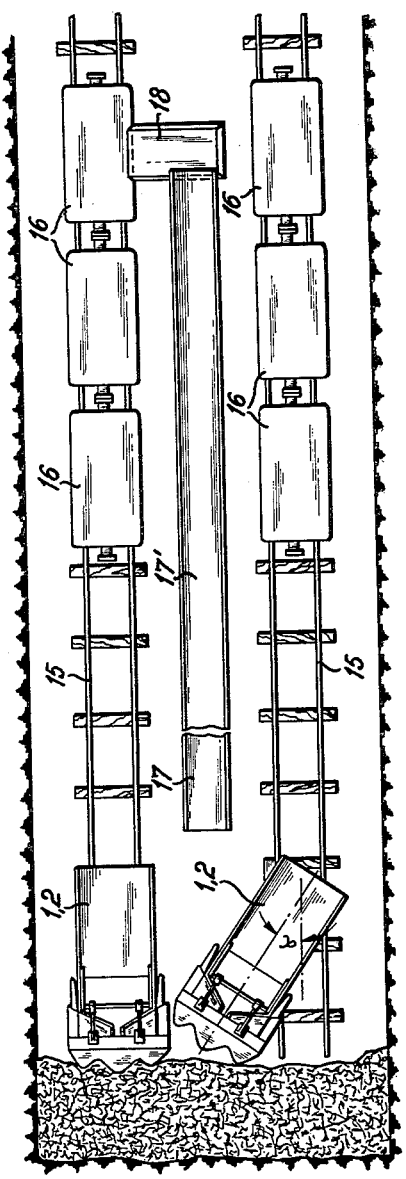
INVENTOR
Clemens Holtermann
BY
Michael S. Striker
attorney United States Patent Office 3,111,235
Patented Nov. 19, 1963

3,111,235
LOADING MACHINE
Clemens Holtermann, Essen-Bredeney, Germany, assignor to Salzgitter Maschinen Aktiengesellschaft, Salzgitter-Bad, Germany
Filed June 20, 1960, Ser. No. 37,482
Claims priority, application Germany July 15, 1959
2 Claims. (Cl. 214—140)

The invention concerns a loading machine comprising a lower carriage, an upper carriage and a shovel which is adapted to be raised or lowered in the manner of a winnowing shovel of a winnowing shovel loading machine.

In the known loading machines of this kind, the shovel which is capable of being raised and lowered is constructed as a winnowing shovel. The heaped material received by the shovel is then dumped overhead, that is, over the loading machine away into a receptacle standing ready behind the loading machine such as a conveyance or chute.

The overhead loading necessitates a comparatively large overall height which is not always available. Moreover, it is difficult with these known loading machines to load on to a conveyor belt since an intermediate apparatus would be necessary for this purpose. Conveying away by means of endless belts is now becoming more popular.

An object of the present invention is to utilise endless conveyor belts for removing the heaped material conveyed.

According to the present invention a loading machine comprises a lower carriage and an upper carriage, and a shovel constructed in the manner of a winnowing shovel loading machine, which shovel is laterally open and adapted to be tipped about an axis laterally of the upper carriage, the tipping axle for the shovel being disposed on a rocker capable of rolling off on the upper carriage and the rolling track of the rocker being vertically adjustable relative to the part of the rocker carrying the shovel.

In this way it becomes possible to dispense completely with overhead loading. It is necessary only for the shovel to be raised to a level for conveying the heaped material on to a laterally disposed endless conveyor belt by means of a subsequent lateral tipping of the shovel. The overhead winnowing shovels of the known loading machines may be exchanged without any modification of the machine for the side tilting shovel constructed in accordance with the invention, and vice versa. Thus, known winnowing shovel loaders may be equipped with the new laterally tiltable shovel.

The tilting axis of the shovel is expediently displaceable from one side of the shovel to the other, whilst the open side of the shovel is optionally provided on one or other end of the shovel. This form of construction makes it possible to deposit the conveyed heaped material alternately on one or other side of the machine.

The lateral ends of the shovel may be closed by means of an exchangeable wall. In this way one and the same shovel can, in the shortest time, be changed over to allow the loose material scooped up to be dumped to one or the other side, in that the exchangeable wall is shifted from one end of the shovel to the other end.

The tipping axis of the shovel may be arranged on a rocker adapted to roll off along the upper carriage, whilst the rolling track of the rocker may be vertically adjustable relative to the part of the rocker carrying the shovel. With this possibility of adjustment of the rocker relative to the rolling track of the rocker vertical adjustment of the shovel in the tilted end position is attainable. This is important in order to be able to adjust the end tilting position of the shovel to the momentary level of the conveyor belt which conveys the material away. Moreover, with this vertical adjustment the overall vertical discharge of the machine can be altered and thus made greater or smaller.

A hydraulic cylinder is conveniently used as the tilting drive for the shovel, which cylinder is arranged so as to be pivotal on the rocker of the upper carriage and whose piston is journalled in the shovel. Such a simple hydraulic drive is particularly suitable for operation underground by reason of its safety in operation.

The invention will be described further, by way of example, with reference to the accompanying drawings, in which:

FIG. 2 is a corresponding plan;

FIG. 4 is an end elevation of the machine showing the shovel in the laterally tilted condition in broken lines;

FIG. 5 is a side view of the machine in use; and

FIG. 6 is a plan corresponding to FIG. 5.

Figure 1:
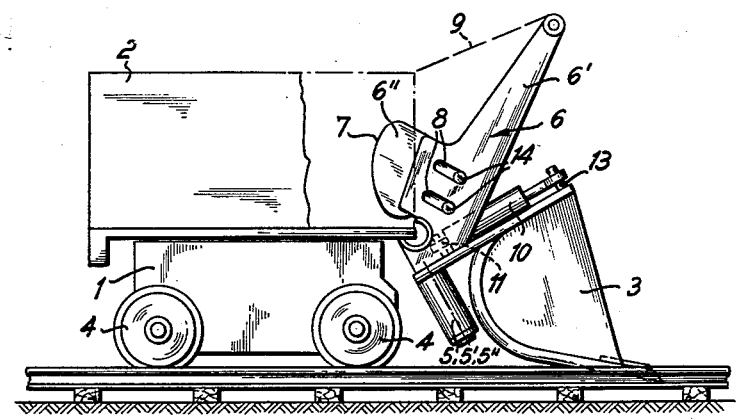
FIG. 1 is a side elevation of the loading machine with its shovel in the lowered position.

A loading machine comprises a lower carriage 1, an upper carriage 2 and a trough-like shovel 3. The lower carriage 1 is displaceable on rails with the assistance of bogie wheels 4. In place of the bogie wheels, other forward displacement means such as, for example, caterpillars, may be used. The upper carriage 2 is laterally displaceable in known manner relative to the lower carriage 1 with rail loaders. The shovel 3 is capable of being tipped to the left or right on an axle 5, which can be optionally introduced into eyes 5' and 5". The eyes 5' and 5" are provided in a rocker 6 and also in the shovel 3. The rocker 6 is constructed in two parts, 6' and 6". The eyes for the tipping axle of the shovel 3 are fixed on the part 6', whilst a rolling track 7 is provided on the part 6". The parts 6' and 6" are adjustable relative to one another and capable of being tightened with the help of slots 8. The part 6' of the rocker 6 is displaceable in known manner with the assistance of chains 9.

The tipping axle 5 of the shovel 3 can be displaced to the position 5' (FIG. 4). It is then possible to tip the shovel 3 above the axle 5 whilst at the point 5" the connection between the shovel 3 and the rocker 6 is released. In this way it is possible to tip the shovel 3 either about the point 5' towards the left (seen from the plane of FIG. 4) or about the point 5" to the right, in each case according as to whether the tipping axle 5 is displaced to the left or to the right.

The drive of the shovel 3 is effected with the assistance of a hydraulic cylinder 10, which is arranged so as to be pivotal at 11 on the rocker 6. A connecting rod 12 of a piston sliding in the cylinder 10 is pivotally connected at 13 with the shovel 3. With the help of the hydraulic piston the shovel 3 can be tipped either to the left or to the right according as to where the tipping axle 5 is inserted, whether at the point 5' or the point 5".

The shovel 3 may be vertically adjusted that is, the amount $x$ may be varied within definite limits. The adjustment is effected by variation of the relative position of the parts 6' and 6" of the rocker 6. This may be achieved by displacement of the fixing screws 14 in the slots 8.

Figure 3:
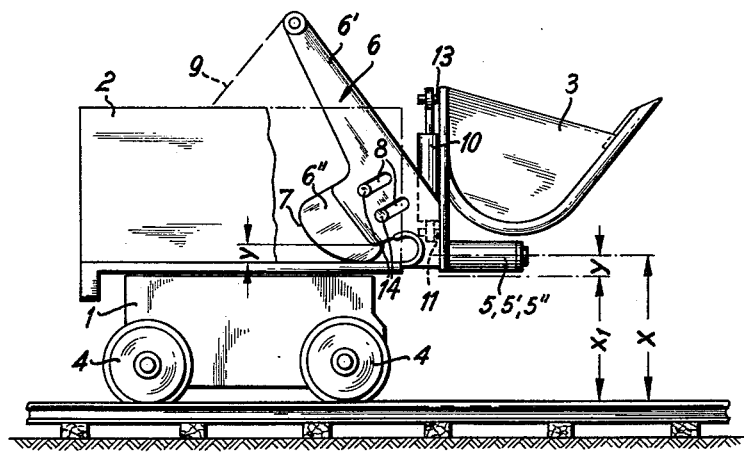
FIG. 3 is an elevation similar to FIG. 1, but showing the shovel in the raised position.

The possibility of varying the height $x$ is particularly clearly evident in FIG. 6. The height $x$ corresponds to the full lines of FIG. 3, height $x_1$ which is smaller than the height $x$, corresponds to the chain-dotted lines. It thus results that the difference between $x$ and $x_1$ has the value $y$. This amount $y$ is the same as the amount $y$ on the rolling cam of the rocker.

The operation of the loading machine is shown in FIGS. 5 and 6. Two loading machines 1, 2 are in use. Each of these machines is displaceable on a rail 15 on which a conveyor car 16 can also be moved. An endless conveyor belt 17 is provided between the two rails 15, the rear end 17' of the conveyor belt rises and leads to a chute 18 by means of which the material which is received can be loaded into the conveyor car 16. In FIG. 6 the field of action of the loading machines 1, 2 is shown. Each machine may be swung to the right or to the left about the angle α from the centre position.

I claim:

1. In a loading machine, in combination, carriage means movable in longitudinal direction and having an upper surface having a front end; a loading shovel; lifting means mounted on said carriage means and including rocker means having a cam surface engaging said upper surface of said carriage means in the region of said front end thereof, lever means connected in the region of one end thereof to said rocker means and projecting with the other end thereof upwardly beyond said rocker means and carrying in the region of said one end said shovel for moving the latter between a lowered loading position and a raised position during tilting of said lever means between a position forwardly inclined relative to said upper surface and a rearwardly inclined position and simultaneous rolling of said cam surface on said upper surface of said carriage means, and means connected to said other end of said lever means for tilting the latter between said position thereof; a pair of first pivot means mounted on said lifting means spaced from each other in a direction transverse to said longitudinal direction; a pair of second pivot means on said loading shovel spaced in said transverse direction a distance equal to the spacing between said first pivot means and respectively aligned with said pair of first pivot means; axle means for selectively connecting one of the first pivot means with the one of said second pivot means aligned therewith so that said shovel may be tilted about said axle means; elongated tilting means movable between an expanded and a contracted position and pivotally connected at opposite ends thereof to said lifting means and said shovel between said first and second pivot means, respectively, for tilting said shovel in said raised position about said axle means, whereby said tilting means will tilt said shovel to one side of the carriage means when said axle means is used to connect one of said aligned first and second pivot means and to the other side of said carriage means when said axle means is used to connect the other of said aligned pivot means.

2. An arrangement as defined in claim 1 and including means to adjust the position of said lever means relative to said rocker means in direction transverse to the longitudinal extension of said lever means.

References Cited in the file of this patent

UNITED STATES PATENTS

| | | |
|---|---|---|
| 2,104,575 | Stoltz | Jan. 4, 1938 |
| 2,523,035 | MacDonald | Sept. 19, 1950 |
| 2,631,745 | Addison | Mar. 17, 1953 |
| 2,679,326 | Isaksen | May 25, 1954 |
| 2,684,162 | Hendrickson et al. | July 20, 1954 |
| 2,821,313 | Warner | Jan. 28, 1958 |
| 2,924,345 | Bodin | Feb. 9, 1960 |
| 2,953,408 | Koenig | Sept. 20, 1960 |
| 3,024,933 | Albert et al. | Mar. 13, 1962 |

FOREIGN PATENTS

| | | |
|---|---|---|
| 1,094,800 | France | Dec. 8, 1954 |